United States Patent
Cannata et al.

(10) Patent No.: US 12,007,999 B1
(45) Date of Patent: Jun. 11, 2024

(54) SYSTEMS, METHODS, AND MEDIA FOR OPERATING A MICROSERVICES ARCHITECTURE WITH A SHARED DISTRIBUTED CACHE

(71) Applicant: FMR LLC, Boston, MA (US)

(72) Inventors: Robert Cannata, Hingham, MA (US); Arun Nadger, Cumberland, RI (US); John Peter Chinnappan, Natick, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/140,125

(22) Filed: Apr. 27, 2023

(51) Int. Cl.
*G06F 16/00* (2019.01)
*G06F 16/2455* (2019.01)
*G06F 16/27* (2019.01)

(52) U.S. Cl.
CPC ........ *G06F 16/24552* (2019.01); *G06F 16/27* (2019.01)

(58) Field of Classification Search
CPC .......................... G06F 16/24552; G06F 16/27
See application file for complete search history.

(56) References Cited

U.S. PATENT DOCUMENTS

| | | | |
|---|---|---|---|
| 9,875,262 B2 * | 1/2018 | McHugh | G06F 16/1873 |
| 2019/0097838 A1 * | 3/2019 | Sahoo | H04L 45/00 |
| 2020/0007530 A1 * | 1/2020 | Mohamad Abdul | H04W 12/084 |
| 2020/0244638 A1 | 7/2020 | Gupta et al. | |
| 2020/0257700 A1 * | 8/2020 | Xu | G06F 8/65 |
| 2020/0265062 A1 * | 8/2020 | Srinivasan | G06F 16/1844 |
| 2022/0342718 A1 * | 10/2022 | Iqbal | H04L 67/63 |

OTHER PUBLICATIONS

Zhang et al., "A Distributed Cache for Hadoop Distributed File System in Real-time Cloud Services", ACM/IEEE, pp. 12-21 (Year: 2012).*
Jenkins et al., "A Case Study in Computational Caching Microservices for HPC", IEEE, pp. 1309-1316 (Year: 2017).*

(Continued)

*Primary Examiner* — Alexander Khong
(74) *Attorney, Agent, or Firm* — Cesari and McKenna, LLP

(57) ABSTRACT

Techniques are provided for managing and operating a microservices architecture with ad distributed cache. A data provider microservice may modify a data object stored on a database managed by the data provider microservice. In response, the modified data object may be transmitted to the distributed cache for storage. A data consumer microservice may request a data object. The distributed cache may be searched for the requested object. If the requested object is stored at the distributed cache, the requested object may be provided to the data consumer microservice. If the requested object is not stored at the distributed cache, the data consumer microservice may issue a request for the data object to the data provider microservice that manages the database that stores the data object. The data provider microservice may provide the data object to the distributed cache for storage and provide the data object to the data consumer microservice.

20 Claims, 4 Drawing Sheets

(56) References Cited

OTHER PUBLICATIONS

Irfan Saleem, Pallavi Nargund, and Peter Buonora, Data Caching Across Microservices in a Serverless Architecture:| Jul. 21, 2021 in Amazon API Gateway, Amazon DynamoDB, Amazon ElastiCache, Architecture, AWS Lambda, Serverless, AWS Architecture Blog, [https://aws.amazon.com/blogs/architecture/data-caching-across-microservices-in-a-serverless-architecture/] retrieved from the internet on Dec. 12, 2023, 6 pages.

Kanjilal, Joydip, "Scaling Microservices Architecture using Caching," Oct. 6, 2021, [https://www.developer.com/design/scaling-microservices-using-cache/] retrieved from the internet Dec. 12, 2023, 4 pages.

* cited by examiner

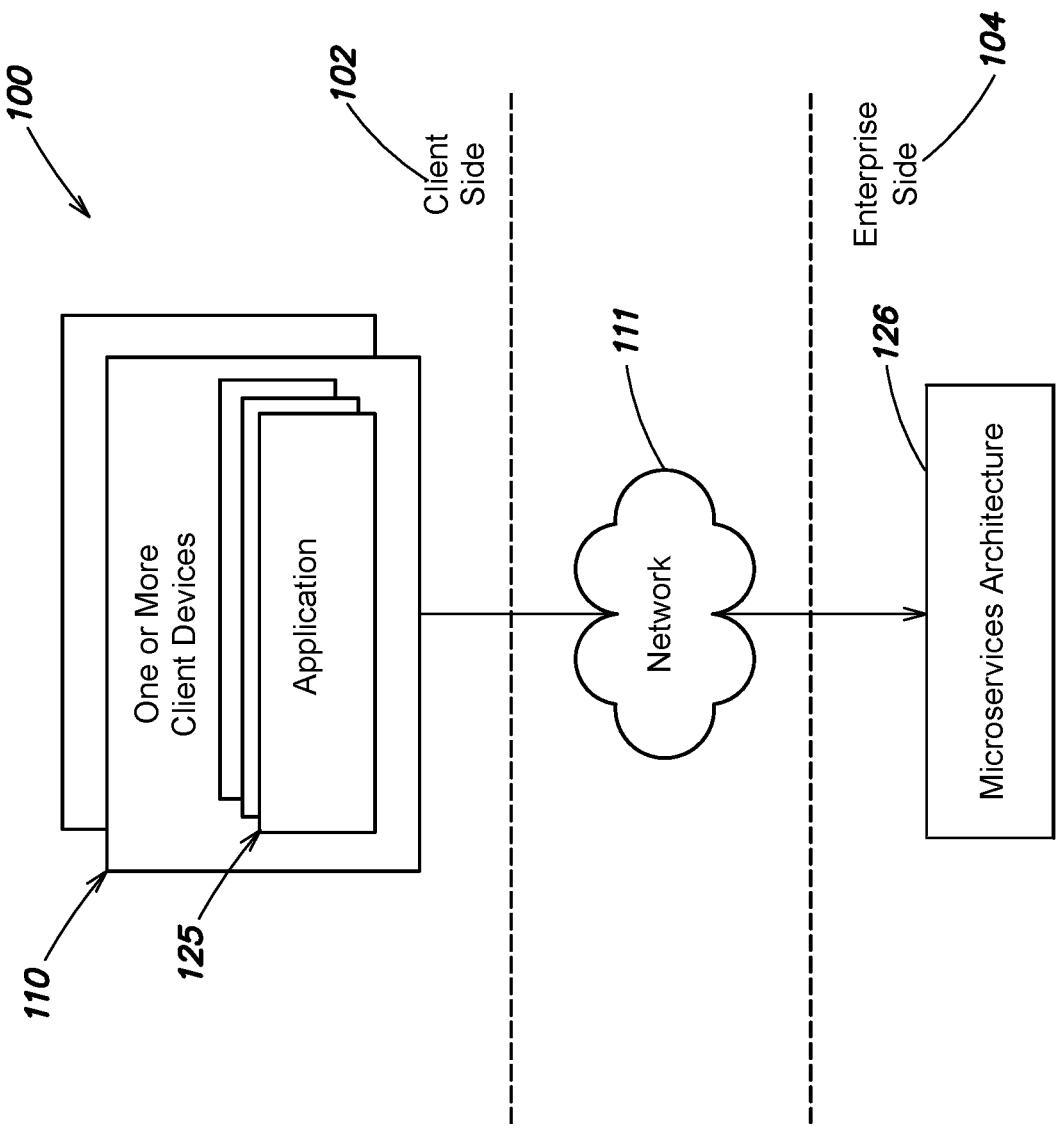

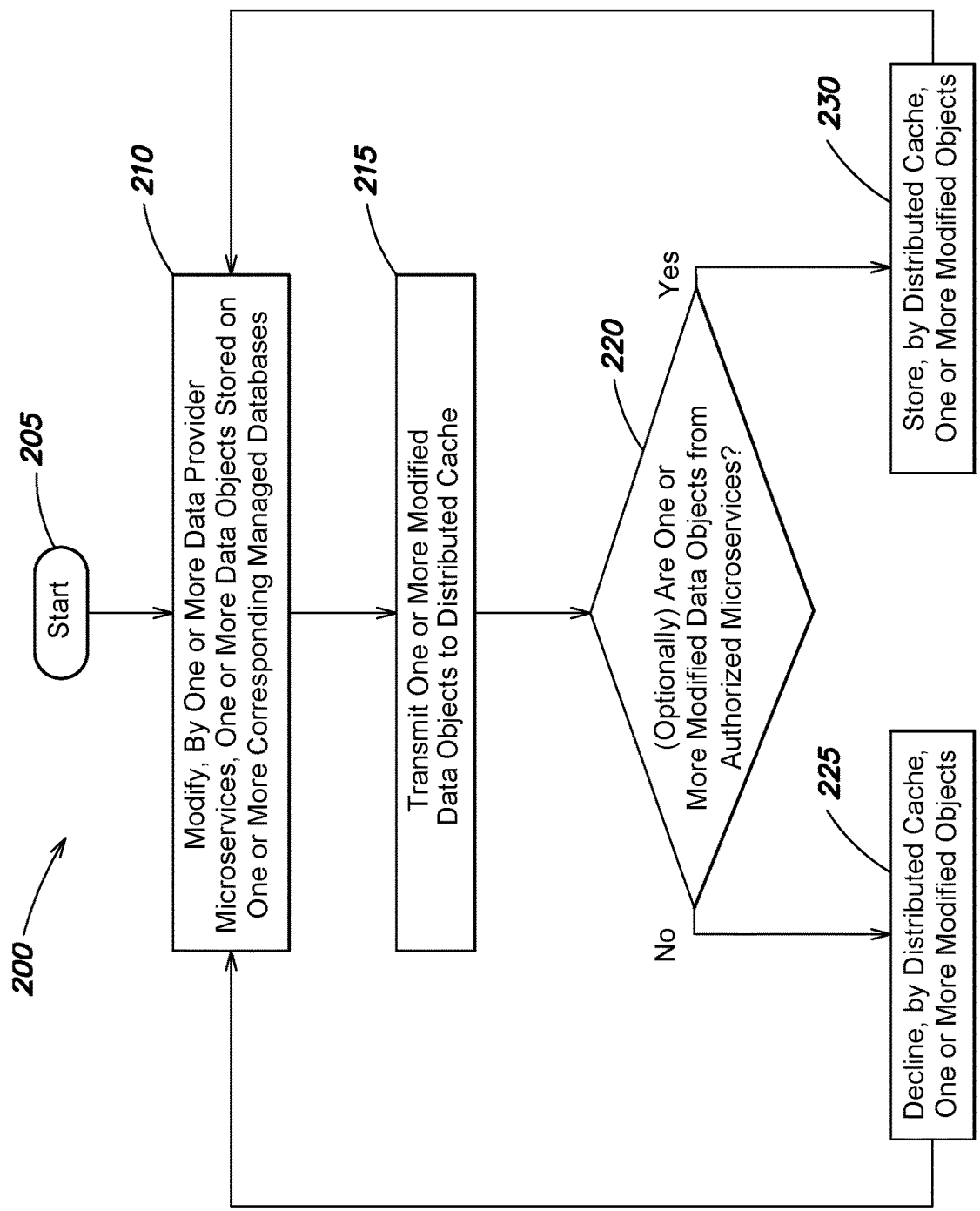

SYSTEMS, METHODS, AND MEDIA FOR OPERATING A MICROSERVICES ARCHITECTURE WITH A SHARED DISTRIBUTED CACHE

TECHNICAL FIELD

The present disclosure relates generally to microservices, and more specifically to techniques for operating a microservices architecture with a shared distributed cache.

BACKGROUND INFORMATION

In recent years, the ubiquity of mobile computing has required application developers to deploy actions quickly and make changes to applications without complete redeployment. This has led to a new development paradigm called "microservices", i.e., a microservices architecture. Microservices are an architectural and organizational approach to software development Where a single software application is, for example, composed of independent services (e.g., microservices). Microservices are lightweight, self-contained components that perform respective functions for the application. Even though microservices are independent from each other, they can communicate with each other over well-defined Application Program Interfaces (APIs) to achieve desired application results.

Because microservices operate independently, each microservice may have its own dedicated resources. For example, each microservice may have its own central processing unit (CPU), runtime environment, database, etc. Though each microservice having its own database promotes microservice independence, it also can introduce significant latency when microservices share data from their databases. For example, microservices may share data using Representational State Transfer (REST) APIs. When an application has low-latency requirements, microservice data sharing using microservices APIs can become a major bottleneck for east-west traffic (e.g., traffic within a data center in which the application comprising the microservices is located).

Therefore, what is needed is a microservices architecture that reduces or mitigates east-west traffic bottlenecks that may be impacted by microservices data sharing.

SUMMARY

Techniques are provided for operating a microservices architecture with a distributed cache according to the one or more embodiments as described herein. Specifically, data from data provider microservices may be stored on a distributed cache in response to the data being modified by the data provider microservices. Subsequently, is data consumer microservices may obtain requested data objects from the distributed cache such that east-west traffic is reduced or mitigated.

In an embodiment, each of one or more data provider microservices may manage a corresponding database. Each data provider microservice may only access and modify data that is stored at the database that is managed by the data provider microservice. In an embodiment, modifying data on a managed database includes one or more of (1) generating new data to be maintained on the managed database, (2) changing data that is stored on the managed database, and (3) deleting data from the managed database.

In response to modifying data by a data provider microservice, the modified data may be provided and stored at a distributed cache in the microservices architecture. The distributed cache may store the modified data objects with an identifier that uniquely identifies the modified data object at the distributed cache. For example, the identifier may include a data type identifier that is unique to a data provider microservice of all the data provider microservices in the microservices architecture. The identifier may also include a data object identifier. In an embodiment, the data type identifier and the data object identifier may, together, uniquely identify the data object on the distributed cache.

In an embodiment, a client device operated by a user (e.g., a customer or employee of an enterprise) may issue a request for a data object. The request may be transmitted from the client device to a data consumer microservice that does not manage a database. The data consumer microservice may issue a command for the requested data object to the distributed cache. The distributed cache may be searched for the requested object.

If the requested object is stored at the distributed cache, the requested object may be provided to the requesting client device. If the requested object is not stored at the distributed cache, the data consumer microservice may send a request, e.g., REST API command, to the data provider microservice that manages the database that stores the requested data object. In response to receiving the request, the data provider microservice may obtain the requested data object and (1) provide the requested object to the distributed cache for storage and (2) provide the requested object to the client device via the requesting data consumer microservice.

Because data consumer microservices can obtain a data object from the distributed cache instead of issuing a data sharing request to a data provider microservice, east-west traffic is reduced/mitigated when compared to conventional microservices architectures. Stated another way, conventional microservices architectures require the use of data sharing API requests among microservices to share objects. This contributes to the amount of east-west traffic in a data center that may include other east-west traffic. Because the one or more embodiments described herein can obtain requested data objects from the distributed cache instead of using data sharing APIs, the one or more embodiments as described herein reduce east-west traffic when compared to conventional systems.

Because east-west traffic is reduced, the one or more embodiments as described herein provide an improvement to microservices systems, i.e., a computer itself, when compared to conventional systems. Additionally, and by reducing east-west traffic, the one or more embodiments as described herein provide an improvement in the existing is technological field of microservices computing.

BRIEF DESCRIPTION OF THE DRAWINGS

The description below refers to the accompanying drawings, of which:

FIG. 1A is a high-level block diagram of an example system environment for operating a microservices architecture with a shared distributed cache according to one or more embodiments as described herein;

FIG. 2 is a flow diagram of a sequence of steps for storing and maintaining data at a distributed cache of a microservices architecture according to the one or more embodiments as described herein.

DETAILED DESCRIPTION OF AN ILLUSTRATIVE

Embodiment

Figure 1B:
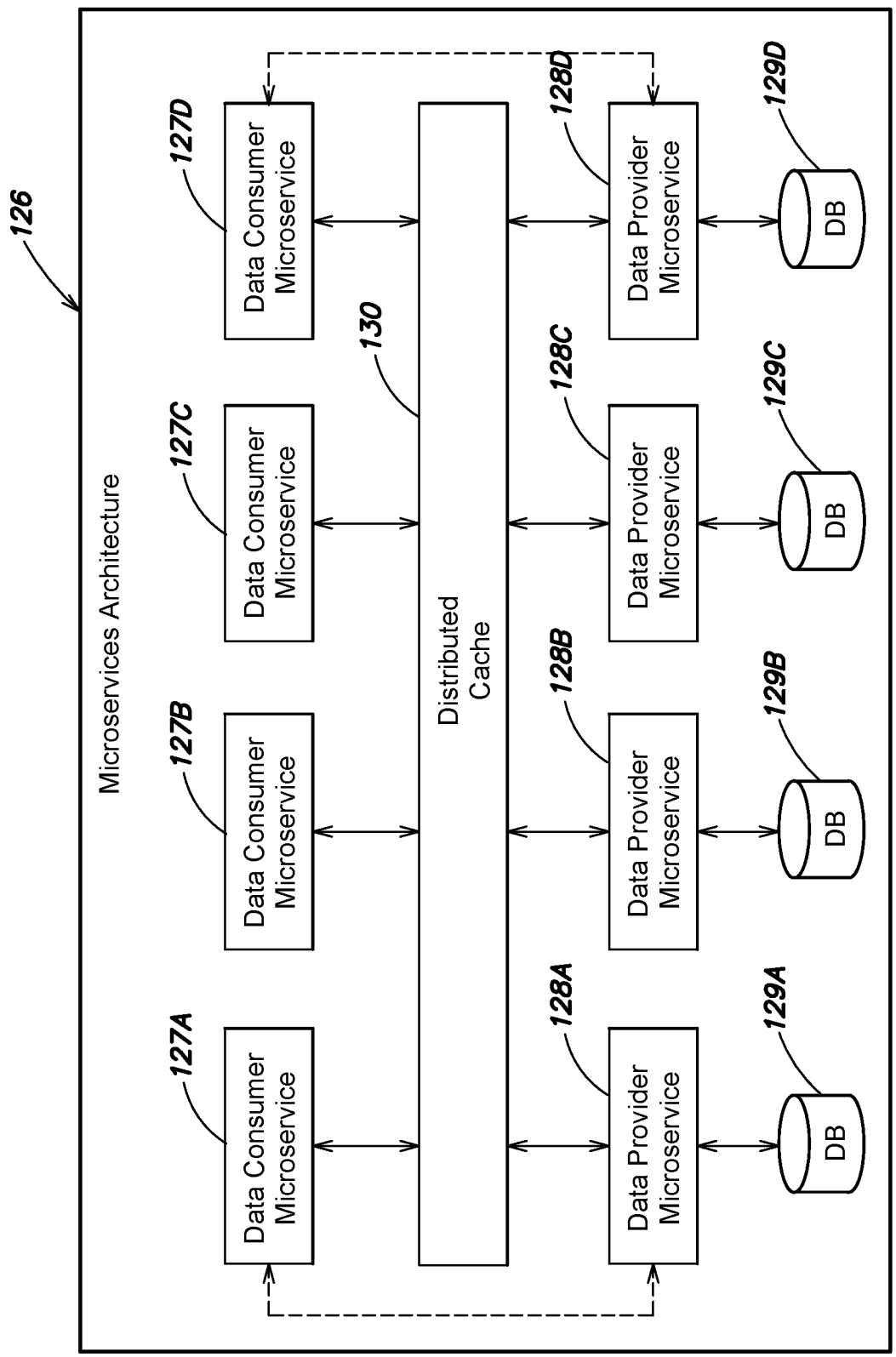
FIG. 1B is a detailed block diagram of an example microservices architecture with a shared distributed cache according to one or more embodiments as described herein.

FIG. 1A is a high-level block diagram of an example system environment 100 for operating a microservices architecture with a shared distributed cache according to one or more embodiments as described herein. The system environment 100 may be divided into a client side 102 that includes one or more local client devices 110 that are local to end users, and an enterprise side 104 that includes microservices architecture 126 that is remote to the end users. Enterprise side 104 may be managed, operated, and maintained by an enterprise. In an embodiment, the enterprise side 104 may be referred to as a data center and the enterprise may be a financial services institution.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. For example, client device 110 may download and execute application 125 that is provided by the enterprise. The execution of application 125 may allow customers of the enterprise to implement one or more financial services functions. Client device 110 may also be operated by authorized personnel, e.g., employees of the enterprise.

The client device 110 may communicate with the microservices architecture 126, managed/operated by the enterprise, over network 111. For example, a user may utilize application 125, executing on client device 110, to request a data object from enterprise side 104 as will be described in further detail below.

FIG. 1B is a detailed block diagram of an example microservices architecture with a shared distributed cache according to one or more embodiments as described herein. Microservices architecture 126 of enterprise side 104 may implement the one or more embodiments as described herein. As will be described in further detail below, the is configuration and operation of microservices architecture 126 with distributed cache 130 may reduce and/or mitigate east-west traffic bottlenecks on the enterprise side 104, e.g., within the data center.

As depicted in FIG. 1B, microservices architecture 126 includes data consumer microservices 127A-127D, data provider microservices 128A-128D, databases 129A-129D, and distributed cache 130. For simplicity and ease of understanding, a data consumer microservice or data consumer microservices may be referenced using reference number 127. Similarly, a data provider microservice or data provider microservices may be referenced using reference number 128. Further, a database or databases may be referenced using reference number 129.

For illustrative purposes, microservices architecture 126 of FIG. 1B includes four data consumer microservices and four data provider microservices with corresponding databases. However, it is expressly contemplated that microservices architecture 126 may include any number of data consumer microservices and data provider microservices with corresponding databases.

In an embodiment, each of data consumer microservices 127 and data provider microservices 128 may implement a different function for a single application. For example, each of data consumer microservices 127 and data provider microservices 128 may implement a different function for application 125 on client side 102. Alternatively, each of data consumer microservices 127 and data provider microservices 128 may implement a different function for an enterprise application (not shown) hosted on the enterprise side 104, wherein the client application 125 interacts with the enterprise is application (not shown).

In an embodiment, each of data consumer microservices 127 may implement a different data consumer function for a financial services application and each of data provider microservices 128 may implement a different data provider function for the financial services application. For example, the different data consumer functions may include, but are not limited to, a UI function, an orders function, a records function, a trades functions, etc. The different data provider functions may include, but are not limited to, a price function, a securities reference function, a customer function, a balances function, etc. In an embodiment, the data consumer microservices and data provider microservices may communicate with each other to implement one or more financial services functions.

As depicted in FIG. 1B, each of data provider microservices 128A-128D may manage at least one database 129. For example, data provider microservice 128A manages database 129A, data provider microservice 128B manages database 129B, data provider microservice 128C manages database 129C, and data provider microservice 129D manages database 129D.

Each of databases 129A-129D may be a relational database that includes one or more tables. Additionally, each of databases 129A-129D may store provider microservice data that includes one or more data objects. In an embodiment, each of databases 129A-129D may store a different type of data object. The type of data object stored in a database 129 may correspond to the function being implemented by the data provider microservice 128 that manages the database 129. For example, the type of data is objects stored in database 129A may correspond to the type of function that data provider microservice 128A implements for an application. Similarly, the type of data object stored in database 129B may correspond to the type of function that data provider microservice 128B implements for the application.

The microservices architecture 126 may include distributed cache 130. The distributed cache 130 may store one or more data objects from databases 129A-129D. As will be described in further detail below with relation to procedure 200 of FIG. 2, a data provider microservice 128 may modify a data object (e.g., create a new data object, change an existing data object, remove/delete an existing data object) on a corresponding database 129. In response to the modifying, the data provider microservice 128 may provide, e.g., transmit, the modified data object to the distributed cache 130 and the distributed cache 130 may store the modified data object. Each of data provider microservices 128 may provide data objects to the distributed cache 130 for storage and may also access the distributed cache 130 to obtain a data object. Additionally, each data provider microservice 128 may request and obtain a data object from a different data provider microservice 128 when, for example, the requested data object is not maintained at the distributed cache 130.

Each of data consumer microservices 127A-127D does not manage a corresponding database 129. As such, the data consumer microservices 127A-127D may not provide data to distributed cache 130 for storage. Instead of managing data via a database 129, a data consumer microservice 127 may request and receive a data object as will be described in further detail below with relation to procedure 300 of FIG. 3. Each is data consumer microservice 127 may access the distributed cache 130 to obtain a data object. Additionally, each data consumer microservice 127 may request and obtain (as indicated by the dashed lines in FIG. 1B) a data object from a data provider microservice 128 when, for example, the requested data object is not maintained at the distributed cache 130.

Therefore, the data consumer microservices 127 can only access distributed cache 130, while data provider microservices 128 may provide data for storage at distributed cache 130 and may also access distributed cache 130 for a data object, i.e., the data provider microservice 128 may also operate as a data consumer microservice 127.

Each computing device, e.g., one or more local client devices 110, data consumer microservices 127, data provider microservices 128, and data cache 130, may include processors, memory/storage, a display screen, and/or other hardware (not shown) for executing software, storing data, and/or displaying information. In an embodiment, data consumer microservices 127 and data provider microservices 128 may each be a server with dedicated resources.

FIG. 2 is a flow diagram of a sequence of steps for storing and maintaining data at a distributed cache 130 of microservices architecture 126 according to the one or more embodiments as described herein. Although the description with relation to FIG. 2 may refer to data provider microservice 128, data consumer microservice 127, and/or data cache 130 performing an operation/function/step, it is expressly contemplated that a processor (not shown) of data provider microservice 128, data consumer microservice 127, and/or data cache 130 may perform the described operation/function/step.

The procedure 200 starts at step 205 and continues to step 210 where one or more data provider microservices 128, e.g., 128A-128D, modify data on a corresponding managed database. For example, data provider microservice 128A may modify data on database 129A, data provider microservice 128B may modify data on database 129B, data provider microservice 128C may modify data on database 129C, and data provider microservice 129D may modify data on database 129D. However, data provider microservice 128A cannot, for example, modify data on databases 129B-129D since data provider microservice 128A does not manage databases 129B-129D.

In an embodiment, a data provider microservice 128 modifying data on a managed database 129 includes one or more of (1) the data provider microservice 128 generating new data to be maintained on the managed database 129, (2) the data provider microservice 128 changing data that is stored on managed database 129, and (3) the data provider microservice 128 deleting data from the managed database 129.

In an embodiment, a request to modify data may originate from client device 110. For example, a user, e.g., customer or authorized employee of the enterprise, may utilize application 125 executing on client device 110 to issue a request to modify data stored on database 129A managed by data provider microservice 128A. In response to receiving the request, data provider microservice 128A may determine if the modification request is consistent with the privileges assigned to the user that is making the request. For example, a user may have privileges to only change data objects, e.g., the user does not is have the privilege to delete/remove data objects. If the modification request is consistent with the privileges, the data provider microservice 128A may modify the data object as requested. If the modification request is inconsistent with the privileges, the data provider microservice 128A may decline to perform the modification and provide a notification to the user via the client device 110.

In an embodiment, a data provider microservice 128 may optionally store an identifier on a managed database 129 indicating that data has been modified. For example, let it be assumed that data provider microservice 128A changes data object X from a value of "2" to a value of "4" in database 129A. In response to changing data object X, the data provider microservice 128A may store an identifier in database 129A indicating that data object X has changed its value. For example, a column of a table stored on database 129A may include a row for each data object, and a row corresponding to data object X may store an identifier of "change" indicating that data object X has changed. If, for example, a new data object has been added to managed database 129A, the data provider microservice 128A may store an identifier of "add". Similarly, if a data object is removed from managed database 129A, data provider microservice 128A may store an identifier of "remove". Although the examples as described herein use particular identifiers to indicate a modified data object, it is expressly contemplated that any of a variety of different identifiers may be utilized.

For the example of FIG. 2, Let it be assumed that data provider microservice 128A changes data object X that is stored on database 129A and data provider microservice 128C adds new data object Y to database 129C.

The procedure 200 continues to step 215 and the one or more modified data objects are transmitted to distributed cache 130. In an embodiment, a data provider microservice 128 may transmit a modified data object to distributed cache 130 in near real-time. For example, and in response to modifying data objects X and Y, data provider microservices 128A and 128C may respectively transmit data objects X and Y to distributed cache 130.

In addition or alternatively, a data provider microservice 128 may transmit a modified data object to distributed cache 130 on-demand. For example, a user, e.g., a customer or employee of the enterprise, may utilize application 125 executing on client device 110 to issue a command requesting that all modified objects be transmitted to distributed cache 130. In response to the command, data provider microservices 128A and 128C may respectively transmit data objects X and Y to distributed cache 130. In addition or alternatively, data provider microservices 128 may transmit modified data objects to distributed cache 130 on a predetermined schedule. For example, let it be assumed that the predetermined schedule is every day at 5:00 PM EST. Therefore, each data provider microservice 128 may transmit the data objects that are modified for that day at 5:00 PM EDT on that same day.

In an embodiment, a modified data object may be transmitted with a data type identifier and a data object identifier. As previously explained, each of databases 129A-129D may store a different type of data object. The type of data object stored in a database 129 may correspond to the function being implemented by the data provider microservice 128 that manages the database 129. For example, the type of data objects is stored in database 129A may correspond to the type of function that data provider microservice 128A implements for an application, while the type of data objects stored in database 129C may correspond to the type of function that data provider microservice 128C implements for the application.

Because data object types are unique for each managed database 129, an identifier for the data object type can be used to uniquely identify the data provider microservice 128 that manages the corresponding database 129. For example, a data type identifier that uniquely identifies the type of data objects stored in database 129A can be used to uniquely identify data provider microservice 128A from the other data provider microservices 128B-128D. Similarly, a data type identifier that uniquely identifies the type of data objects stored in database 129C can be used to uniquely identify data provider microservice 128C from the other data provider microservices 129A, 129B, and 129D.

For this example, let it be assumed that identifier "111" is a data type identifier for the data objects stored on database 129A that is managed by data provider microservice 128A. Therefore, identifier "111" may uniquely identify data provider microservice 128A from data provider microservices 128B-128D. Further, let it be assumed that identifier "222" is a data type identifier for the data objects stored on database 129C that is managed by data provider microservice 128C. Therefore, identifier "222" may uniquely identify data provider microservice 128C from data provider microservices 128A, 128B, and 128D.

Additionally, a data object identifier may uniquely identify a data object on a is database 129. For example, an identifier of "X1" may uniquely identify data object X from all other data objects stored on database 129A. Further, an identifier of "Y2" may uniquely identify data object Y from all other data objects stored on database 129C. It should be noted that because the data object identifier is unique for a database 129, multiple databases 129 may use the same data object identifier. For example, database 129A may store a data object with a data object identifier of "Y2". Similarly, database 129C may store a data object with a data object identifier of "X1".

Therefore, and based on modifying data object X, data provider microservice 128A may transmit data object X, data type identifier "111", and data object identifier "X1" to distributed cache 130. Based on modifying data object Y, data provider microservice 128C may transmit data object Y, data type identifier "222", and data object identifier "Y2" to distributed cache 130.

The procedure 200 optionally continues to step 220 and the distributed cache 130 determines if the one or more modified data objects are from authorized microservices. In an embodiment, the distributed cache 130 may maintain a data structure (not shown) that stores data type identifiers that correspond to data provider microservices 128 that are authorized to store data objects at distributed cache 130. For this example, let it be assumed that the data structure maintained at distributed cache 130 indicates that data provider microservices 128A-12BC are authorized data provider microservices 128. As such, data objects from databases 129A-129C can be provided by data provider microservices 128A-128C to distributed cache 130 for storage. If, for example, data is provider microservice 128D provides a modified data object from database 129D to distributed cache 130, distributed cache 130 may determine that the data type identifier for data provider microservice 128D is not included in the data structure. As such, the distributed cache 130 may reject the request to store the data object from database 129D.

In an embodiment, data consumer microservices 127 are not permitted to store objects on distributed cache 130. As such, and in this example, if the data consumer microservice 127 provides data to the distributed cache 130 for storage, the distributed cache 130 may decline the storage request.

If at optional step 220 it is determined that the one or more modified data objects are not from authorized microservices, the procedure continues to step 225 and the distributed cache 130 does not store the received modified data objects. The procedure 200 continues from step 225 and reverts to step 210 such that modified data objects can be provided, repeatedly and iteratively, from microservice data provider 128A-128D and stored to the distributed cache 130.

If optional step 220 is not performed or if it is determined at optional step 220 that the one or more modified data objects are from authorized microservices, the procedure continues to step 230. At step 230, the distributed cache 130 stores the received modified data objects. In an embodiment, a modified object is stored at distributed cache 130 with the transmitted data type identifier and data object identifier. In this example, data object X is stored at distributed cache 130 with data type identifier "111" and data object identifier "X1". Similarly, data object Y is stored at distributed cache 130 with data type identifier "222" and data object identifier "Y2".

As previously mentioned, the data object identifier for a data object may be unique on the database 129 on which the data object is stored. However, the data object identifier may not be unique across databases 129. Therefore, the data type identifier, which is unique for each data provider microservice 128 and its managed database 129, can be utilized in conjunction with the data object identifier to uniquely identify the data object on distributed cache 130. As such, and in this example, the data type identifier of "111" and data object identifier of "X1" can uniquely identify data object X, that is from data provider microservice 128A, on distributed cache 130. Similarly, the data type identifier of "222" and data object identifier of "Y2" can uniquely identify data object Y, that is from data provider microservice 128C, on distributed cache 130.

In an embodiment, the distributed cache 130 may determine if there is enough available storage on the distributed cache 130 to store the one or more modified data objects. If there is not enough available storage, the distributed cache 130 may implement an eviction policy to remove one or more existing data objects from the distributed cache 130 to enable the necessary storage to store the one or more modified data objects. In an embodiment, the eviction policy is a time to live algorithm that evicts existing cache data from the distributed cache 130 that is the oldest. In an embodiment, the eviction policy is an algorithm that evicts the least-frequently used data objects from the distributed cache 130. Alternatively, any of a variety of different eviction policies may be utilized by the distributed cache.

In addition or alternatively, the distributed cache 130 may implement an eviction policy when the available storage on the distributed cache 130 reaches a threshold amount. For example, the distributed cache 130 may implement an eviction policy when there is only 10% available storage on the distributed cache 130.

The procedure 200 continues from step 230 and reverts to step 210 such that modified data objects can be provided, repeatedly and iteratively, from microservice data provider 128A-128D and stored to the distributed cache 130.

As will be described in further detail below, a microservice, e.g., a consumer microservice 127, may request a data object from distributed cache 130. If the data object is stored at the distributed cache 130, the data object may be provided from the distributed cache 130 to the requesting microservice. If the data object is not stored at distributed cache 130, the microservice may directly request the data object from a data provider microservice, and the data object may be stored at the distributed cache 130 and provided to the requesting microservice.

Figure 3:
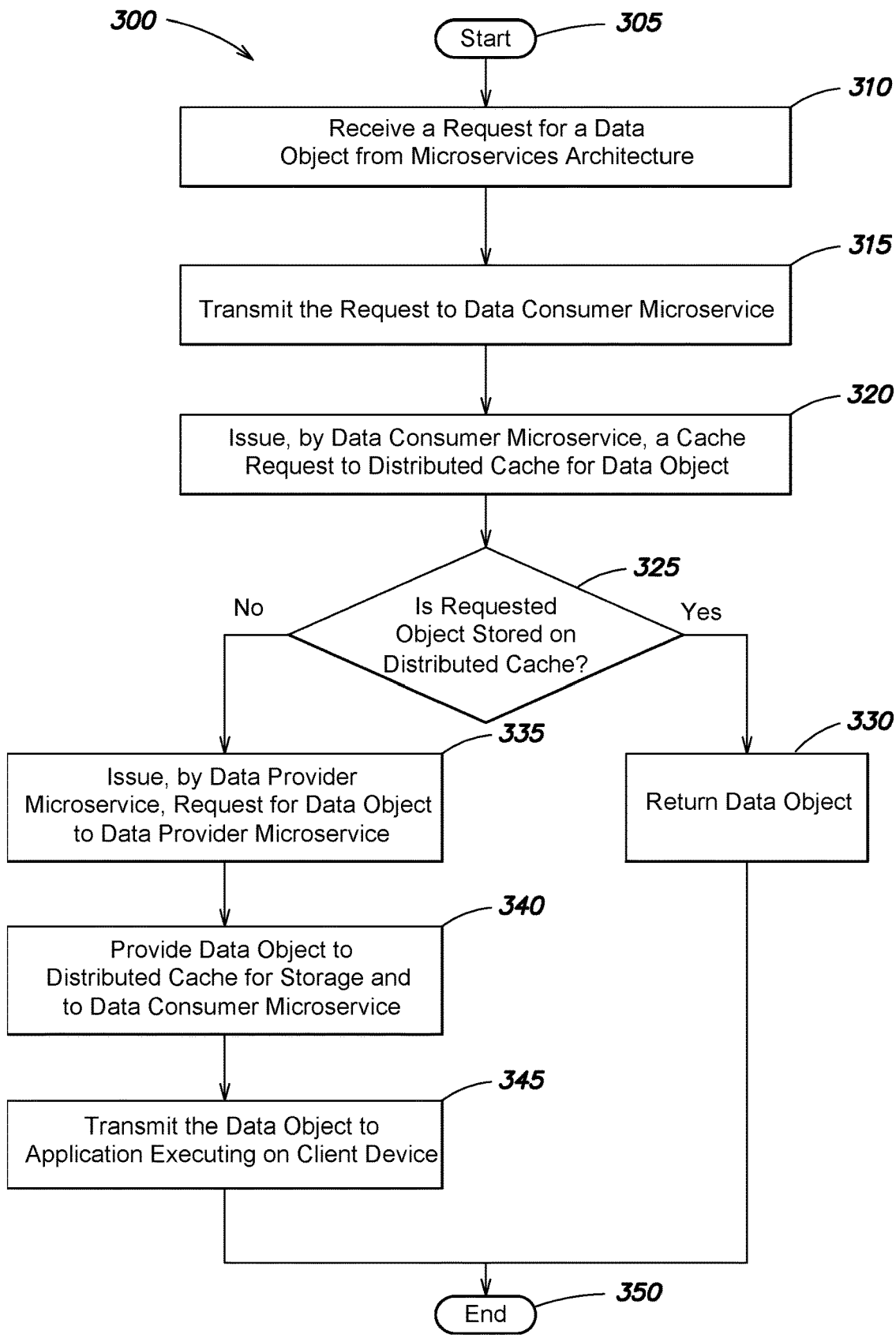
FIG. 3 is a flow diagram of a sequence of steps for a microservice requesting data from a microservices architecture with a distributed cache according to the one or more embodiments as described herein.

FIG. 3 is a flow diagram of a sequence of steps for a microservice requesting data from a microservices architecture 126 with distributed cache 130 according to the one or more embodiments as described herein. Although the description with relation to FIG. 3 may refer to data provider microservice 128, data consumer microservice 127, and/or data cache 130 performing an operation/function/step, it is expressly contemplated that a processor (not shown) of data provider microservice 128, data consumer microservice 127, and/or data cache 130 may perform the described operation/function/step.

The procedure 300 starts at step 305 and continues to step 310 where a request is received for a data object from microservices architecture 126. In an embodiment, the request may be issued from client device 110 on client side 102. Specifically, a user may is utilize application 125 executing on client device 110 to request a data object. For example, a customer or employee of a financial services institution may utilize application 125 executing on client device 110 to request a financial services data object. Continuing with the example utilized in relation to FIG. 2, let it be assumed that a user requests data object Y using application 125 executing on client device 110.

In an embodiment, the request from the client device 110 may invoke an API corresponding to a particular microservice. Specifically, each of data consumer microservices 127 and/or data provider microservice 128 may publish the API utilized to request its services. As such, the client device 110 may issue the request utilizing a published API for a particular microservice. Alternatively, the request may be issued to an API gateway (not shown). The API gateway may act as a single-entry endpoint to the microservices architecture 126 that maps and forwards the request issued by client device 110 to the appropriate data consumer microservice 127, for example.

The procedure 300 continues to step 315 and the request for the data object is transmitted to a data consumer microservice 127. In an embodiment, the request from the client device 110 may be transmitted over network 111 to a data consumer microservice 127. Alternatively, the request from the client device 110 may be transmitted over network 111 to a data provider microservice 128 that operates as a data consumer in addition to operating as a data provider microservice. In this example, let it be assumed that the request for data object Y is transmitted from the client device 110 to data consumer microservice 127B utilizing the API for data consumer microservice 127B.

The procedure continues to step 320 and the data consumer microservice 127 is issues a cache request to the distributed cache 130 for the data object. In an embodiment, the cache request includes at least an object type identifier and an object identifier corresponding to the requested data object. For this example, the cache request transmitted from data microservice 127B to distributed cache 130 includes at least data type identifier of "222" and data object identifier "Y2" for data object Y.

The procedure continues to step 325 and the distributed cache 130 determines if the requested data object is stored (i.e., cache hit) or not stored (i.e., cache miss) at the distributed cache 130. In an embodiment, the distributed cache 130 utilizes the data type identifier and the data object identifier included in the cache request from data consumer microservice 127B to search the distributed cache 130 for the requested data object. Specifically, the data type identifier and the data object identifier may uniquely identify the data object in the distributed cache 130.

In this example, the data type identifier of "222" and the data object identifier of "Y2" uniquely identify data object Y at distributed cache 130. As such, the distributed cache 130 utilizes the data type identifier of "222" and the data object identifier of "Y2" to search the distributed cache 130 for data object Y.

If it is determined at step 325 that the requested data object is stored at the distributed cache 130, the procedure continues to step 330 and the requested data object is returned. For example, the distributed cache 130 may provide the data object Y to data consumer microservice 127B, and data consumer microservice 127B may return data object Y to client device 110 that issued the request for data object Y. Alternatively, the distributed cache 130 may directly transmit requested data object Y to client device 110. The procedure then ends at step 350.

If it is determined at step 325 that the requested data is not stored at the distributed cache 130, the procedure 300 continues from step 325 to step 335. At step 335, the data consumer microservice 127 may issue a request for the data object to a data provider microservice 128 that manages a database 129 that stores the requested data object. In an embodiment, the data consumer microservice 127 may issue the request utilizing the published IP of the data provider microservice 128.

In an embodiment, the request from the data consumer microservice 127 includes a data type identifier and/or data object identifier for the requested data object. In an embodiment, the data consumer microservice 127 may issue the request to an API gateway that may issue a subsequent request, that includes the data type identifier and/or data object identifier, to the data provider microservice 128 utilizing the API of the data provider microservice 128.

Procedure 300 continues from step 335 to step 340. At step 340, and in response to receiving the request from the data consumer microservice 127 for the data object, the data provider microservice 128 provides the requested data object to the distributed cache 130 for storage and the data consumer microservice 127. Specifically, the data provider microservice 128 may utilize the data object identifier, included in the request from the data consumer microservice 127, to obtain the data object from the managed database 129. The data consumer microservice 127 may then transmit, in parallel or serially, the obtained data object to the distributed cache 130 for storage and to the data consumer microservice 127 that requested the data object. The data object may be stored at the distributed cache 130 with a data type identifier and a data object identifier.

The procedure continues to step 345 and the data consumer microservice 127 transmits the data object to the requesting client device 110. Specifically, the data consumer microservice 127 may transmit the data object to the application 125 executing on the client device 110. The procedure 300 then continues from step 345 to step 350 and ends.

According to the one or more embodiments as described herein, a data consumer microservice 127 can obtain a requested data object from distributed cache 130 without having to issue a microservice data sharing request, e.g., REST API, to a data provider microservice 128. Because microservice data sharing is not required when the data object can be obtained from the distributed cache 130, the one or more embodiments as described herein reduce east-west traffic when compared to conventional microservices architectures that require microservice data sharing between microservices to share data objects.

Because east-west traffic is reduced according to the one or more embodiments described herein, the response latency at data consumer microservices 127 requesting a data object is also reduced. For example, the following tables illustrate different response latencies. The first table illustrates the response latency for data consumer microservices 127 operating in microservices architecture 126 with distributed cache 130 according to the one or more embodiments as described herein. The second table illustrates the is response latency for data consumer microservices operating in conventional microservices architectures without a distributed cache and that require microservice data-sharing (e.g., east-west traffic) to share data objects.

| Data Consumer Microservices 127 Accessing Cache 130 | | |
| --- | --- | --- |
| Test Duration | Response latency calculated at the data consumer service (ms) | Number of Accounts in Cache |
| 10 min | 1.5 | 1 Million |
| 60 min | 1.5 | 1 Million |

| Data Consumer Requesting the provider Rest API | | |
| --- | --- | --- |
| Test Duration | Response latency calculated at consumer service of conventional systems(ms) | Number of Accounts in Database |
| 10 min | 20 | 1 Million |
| 60 min | 25 | 1 Million |

As illustrated above, the data consumer microservices 127 experience a response latency of 1.5 ms during both test durations (e.g., 10 minutes and 60 minutes) when obtaining the requested data objects from distributed cache 130 of microservices architecture 126 according to the one or more embodiments as described herein. In contrast, data consumer microservices of conventional systems that utilize microservice data sharing to obtain data objects (e.g., east-west traffic) experience a response latency of 20 ms and 25 ms for the two test durations, respectively. Because the one or more embodiments improve latency (e.g., reduce latency for requested objects) when compared to conventional techniques, the one or more embodiments as described herein provide an improvement to the computer, e.g., microservices architecture 126, itself and also provide an improvement in the existing technological field of microservices computing.

It should be understood that a wide variety of adaptations and modifications may be made to the techniques. For examples, the steps of the flow diagrams as described is herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium.

Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computerized method for operating a microservices architecture that includes a distributed cache, the method comprising:
 receiving a request from a data consumer microservice for a particular data object of a plurality of different data objects;
 determining whether the particular data object is stored at the distributed cache;
 providing the particular data object from the distributed cache to the data consumer microservice in response to determining that the particular data object is stored at the distributed cache; and
 in response to determining that the particular data object is not stored at the distributed cache,
  issuing, from the data consumer microservice, a command for the particular data object to a particular data provider microservice of a plurality of different data provider microservices,
   wherein each of the plurality of different data provider microservices manages a database that maintains a persistent state of provider microservice data, and wherein a managed database is only accessible by a corresponding data provider microservice that manages the managed database,
  providing the particular data object from the particular data provider microservice to the distributed cache,
  storing the particular data object at the distributed cache, and
 providing the particular data object from the particular data provider microservice to the data consumer microservice.

2. The computerized method of claim 1, further comprising:
 modifying, by a selected data provider microservice of the plurality of different data provider microservices, selected provider microservice data that is maintained at a selected database managed by the selected data provider microservice; and
 storing, in response to the modifying step, a selected data object at the distributed cache, wherein the selected data object corresponds to the selected provider microservice data that is modified, and wherein the distributed cache is accessible by each of the plurality of different data provider microservices and the data consumer microservice.

3. The computerized method of claim 2, wherein modifying the selected provider microservice data maintained at the selected database includes one of (1) generating the selected provider microservice data as new data that is stored in the selected database, (2) changing the selected provider microservice data that is stored in the selected database to generate changed provider microservice data that is stored in the selected database, or (3) deleting the selected provider microservice data from the selected database.

4. The computerized method of claim 1, wherein the request includes an object type and a key that identify the particular data object, and each of the plurality of different data provider microservices is associated with a different object type.

5. The computerized method of claim 1, further comprising:
receiving, from a client application executing on a client device, a client request for the particular object;
in response to receiving the request from the client application, issuing a client command from the client application to the data consumer microservice requesting the particular data object.

6. The computerized method of claim 1, wherein a software application includes a plurality of functions and each function is implemented by a different microservice of (1) the plurality of different data provider microservices and (2) the data consumer microservice.

7. The computerized method of claim 1, further comprising:
implementing, by the distributed cache, an eviction policy to remove one or more first data objects from the distributed cache, wherein the eviction policy is one of a time to live and a cache capacity policy that prioritizes eviction of least-frequently used data objects.

8. The computerized method of claim 1, wherein only the plurality of different data provider microservices, of the plurality of different data provider microservices and the data consumer microservice, provide particular data to be stored at the distributed cache.

9. A system for operating a microservices architecture that includes a distributed cache, the system comprising:
a data consumer microservice configured to issue a request for a particular data object of a plurality of data objects;
the distributed cache configured to determine whether the particular data object is stored at the distributed cache;
the distributed cache further configured to provide the particular data object from the distributed cache to the data consumer microservice in response to determining that the particular data object is stored at the distributed cache; and
in response to determining that the particular data object is not stored at the distributed cache,
the data consumer microservice further configured to issue a command to a particular data provider microservice, of a plurality of different data provider microservices, for the particular data object,
wherein each of the plurality of different data provider microservices manages a database that maintains a persistent state of provider microservice data, and wherein a managed database is only accessible by a corresponding data provider micro service that manages the managed database,
the particular data provider microservice configured to provide the particular data object to the distributed cache,
the distributed cache further configured to store the particular data object, and
the particular data provider microservice further configured to provide the particular data object to the data consumer microservice.

10. The system of claim 9, further comprising:
a selected data provider microservice, of the plurality of different data provider microservices, configured to modify selected provider microservice data that is maintained at a selected database managed by the selected data provider microservice; and
the distributed cache further configured to store a selected data object corresponding to the selected provider microservice data that is modified, wherein the distributed cache is accessible by each of the plurality of different data provider microservices and the data consumer microservice.

11. The system of claim 10, wherein when modifying the selected provider microservice data maintained in the selected database, the selected data provider microservice further configured to (1) generate the selected provider microservice data as new data that is stored in the selected database, (2) change the selected provider microservice data that is stored in the selected database to generate changed provider microservice data that is stored in the selected database, or (3) delete the selected provider microservice data from the selected database.

12. The system of claim 9, wherein the request includes an object type and a key that identify the particular data object, and each of the plurality of different data provider microservices is associated with a different object type.

13. The system of claim 9, further comprising a client application configured to issue a client request for the particular object to the data consumer microservice.

14. The system of claim 9, wherein a software application includes a plurality of functions and each function is implemented by a different microservice of (1) the plurality of different data provider microservices and (2) the data consumer microservice.

15. The system of claim 9, wherein the distributed cache is further configured to implement an eviction policy to remove one or more first data objects from the distributed cache, wherein the eviction policy is one of a time to live and a cache capacity policy that prioritizes eviction of least-frequently used data objects.

16. The system of claim 9, wherein only the plurality of different data provider microservices, of the plurality of different data provider microservices and the data consumer microservice, provide particular data to be stored at the distributed cache.

17. A non-transitory computer readable medium having software encoded thereon, the software when executed by one or more computing devices operable to:
receive a request from a data consumer microservice for a particular data object of a plurality of different data objects;
determine whether the particular data object is stored at a distributed cache of a microservices architecture;
provide the particular data object from the distributed cache to the data consumer microservice in response to determining that the particular data object is stored at the distributed cache; and
in response to determining that the particular data object is not stored in the distributed cache,
issue, from the data consumer microservice, a command for the particular data object to a particular data provider microservice of a plurality of different data provider microservices,
is wherein each of the plurality of different data provider microservices manages a database that maintains a persistent state of provider microservice data, and wherein a managed database is only accessible by a corresponding data provider microservice that manages the managed database, provide the particular data object from the particular data provider microservice to the distributed cache, store the particular data object at the distributed cache, and provide the particular data object from the particular data provider microservice to the data consumer microservice.

18. The non-transitory computer readable medium of claim 17, wherein the request includes an object type and a key that that identify the particular data object, and wherein each of the plurality of different data provider microservices is associated with a different object type.

19. The non-transitory computer readable medium of claim 17, the software when executed by the one or more computing devices further operable to:

implement an eviction policy at the distributed cache to remove one or more first data objects from the distributed cache, wherein the eviction policy is one of a time to live and a cache capacity policy that prioritizes eviction of least-frequently used data objects.

20. The non-transitory computer readable medium of claim 17, wherein a software application includes a plurality of functions and each function is implemented by a different microservice of (1) the plurality of different data provider microservices and (2) the data consumer microservice.

* * * * *